(12) United States Patent
Chung et al.

(10) Patent No.: US 8,187,429 B2
(45) Date of Patent: May 29, 2012

(54) WASTEWATER TREATMENT APPARATUS AND METHOD WITH STAIR-LIKE HEAT TREATMENT TANKS

(75) Inventors: Jen-Chieh Chung, Taoyuan County (TW); Ming-Hsin Wu, Taoyuan County (TW); Yu-Chang Liu, Taoyuan County (TW)

(73) Assignee: Institute of Nuclear Energy Research Atomic Energy Council, Executive Yuan, Taoyuan County (TW)

( * ) Notice: Subject to any disclaimer, the term of this patent is extended or adjusted under 35 U.S.C. 154(b) by 385 days.

(21) Appl. No.: 12/604,151

(22) Filed: Oct. 22, 2009

(65) Prior Publication Data

US 2011/0073460 A1 Mar. 31, 2011

(30) Foreign Application Priority Data

Sep. 25, 2009 (TW) .............................. 98132439 A

(51) Int. Cl.
*B01D 1/00* (2006.01)
*B01D 3/00* (2006.01)
*B01D 61/00* (2006.01)
*B01D 17/00* (2006.01)
*C02F 1/02* (2006.01)
*C02F 1/68* (2006.01)
*C02F 1/72* (2006.01)

(52) U.S. Cl. .......... 203/10; 159/15; 159/26.1; 159/28.2; 159/47.3; 159/901; 159/DIG. 40; 202/237; 202/262; 210/177; 210/652; 210/737; 210/742; 210/750; 210/758; 210/765; 210/766; 210/774; 210/805

(58) Field of Classification Search .................... 159/14, 159/15, 26.1, 28.2, 44, 47.3, 901, DIG. 1, 159/DIG. 40; 202/160, 237, 262; 203/2, 203/10; 210/652, 712, 737, 742, 750, 758, 210/765, 774, 766, 805, 177
See application file for complete search history.

(56) References Cited

U.S. PATENT DOCUMENTS

| | | | |
|---|---|---|---|
| 4,604,214 A | 8/1986 | Carr et al. | |
| 5,040,013 A * | 8/1991 | Kurokawa et al. | 396/622 |
| 5,302,995 A * | 4/1994 | Hayashi | 396/630 |
| 5,353,085 A * | 10/1994 | Kurematsu et al. | 396/632 |

(Continued)

FOREIGN PATENT DOCUMENTS

EP 0573927 * 12/1993

*Primary Examiner* — Virginia Manoharan
(74) *Attorney, Agent, or Firm* — Morris Manning & Martin LLP; Tim Tingkang Xia, Esq.

(57) ABSTRACT

A wastewater treatment apparatus and method with stair-like heat treatment tanks for performing a breakdown process are disclosed, in which the apparatus comprises: a mixing tank, for evenly mixing wastewater with reaction agents and thus forming a mixed solution; a plurality of heat treatment tanks, for enabling the mixed solution to circulate therein while being heating for a period of time so as to perform an organic destruction process upon the mixed solution and thus cause a discharging liquid to be formed; a heat exchanger, for enabling a heat exchanging process between the discharging liquid and the mixed solution to be performed therein; a condensation tank, for receiving and cooling the discharging liquid; a water purifier, for purifying and thus separating the discharging water into a cleaned water and a concentrated liquid for outputting; an agent recycling unit, for electrolyzing the concentrated liquid so as to recycle the reaction agents.

28 Claims, 6 Drawing Sheets

U.S. PATENT DOCUMENTS

| | | | |
|---|---|---|---|
| 5,400,105 A * | 3/1995 | Koboshi et al. | 396/632 |
| 5,452,851 A * | 9/1995 | Albert et al. | 229/301 |
| 5,552,851 A * | 9/1996 | Koboshi et al. | 396/568 |
| 5,820,761 A | 10/1998 | Holzer et al. | |
| 6,010,632 A | 1/2000 | Ross et al. | |
| 6,156,120 A * | 12/2000 | Heffels et al. | 118/56 |
| 6,319,412 B1 | 11/2001 | Reyna | |
| 6,379,565 B1 | 4/2002 | Guirguis et al. | |
| 2004/0094398 A1 * | 5/2004 | Karoliussen | 202/96 |
| 2004/0265194 A1 * | 12/2004 | Carroni et al. | 422/212 |
| 2005/0269254 A1 * | 12/2005 | Roitman | 210/252 |
| 2008/0230184 A1 * | 9/2008 | Eigenberger et al. | 159/7 |
| 2009/0294548 A1 * | 12/2009 | Geiger et al. | 239/6 |

* cited by examiner

WASTEWATER TREATMENT APPARATUS AND METHOD WITH STAIR-LIKE HEAT TREATMENT TANKS

FIELD OF THE INVENTION

The present invention relates to a wastewater treatment apparatus and method with stair-like heat treatment tanks, and more particularly, to a compact-sized wastewater treatment apparatus with high performance efficiency.

BACKGROUND OF THE INVENTION

When it comes to the selection of a water treatment technique for treating an organic wastewater, it is important to take the characteristics of substrates and contaminants relating to the organic wastewater treatment into consideration so as to find a technically effective and economically feasible wastewater treatment method specifically for treating such organic wastewater. Wastewater treatment can be a multistage process to renovate wastewater before it reenters a body of water. The goal is to reduce or remove organic matter, solids, nutrients, disease-causing organisms and other pollutants from wastewater, which can include the following processes: (1) biological treatment, such as bacterial decomposition; (2) chemical treatment, such as chemical oxidation and chemical precipitation; (3) thermal treatment, such as incineration and plasma treatment; (4) physical treatment, such as filtration and separation. Moreover, the first three processes are capable of converting the organic compounds in the wastewater into non-toxic compounds that can be easily decomposed, or breaking down the same completely into inorganic compounds, carbon dioxide and water, which are exemplified by the wet oxidation method, supercritical water oxidation method and Fenton's oxidation method shown respectively in U.S. Pat. No. 5,820,731, U.S. Pat. No. 6,010,632, U.S. Pat. No. 4,604,214. The aforesaid method are advantageous in that: they are capable of effectively breaking down the organic pollutants into carbon dioxide, water and other compounds of low molecular weight such as acids or simple hydrocarbons, through the oxidation effect induced by high temperature and high pressure or by hydroxyl (OH) free radicals. However, it is important to design a process for removing the chemical reagents added in the wastewater during the performing of the aforesaid methods so as to prevent the generation of some organic compounds of higher toxicity during the breaking down of the original organic pollutants in the wastewater and therefore cause the generation of so-called secondary waste effluent.

As for the aforesaid physical treatment, it is performed by the use of a filtration means to screen and separate those toxic organic solids from the wastewater so as to purify the same for discharging, in that there is no chemical change in the structures of the toxic organic solids. There are already many such physical treatments currently available, such as those disclosed in U.S. Pat. No. 6,319,412 and U.S. Pat. No. 6,379,555, which uses an activated carbon disposed on a fixed bed for absorbing the organic solids suspended in the wastewater for preparing the same for the other subsequent processes. The aforesaid physical treatment is advantageous in that: there will be no secondary waste effluent problem since there has no chemicals being added into the wastewater during the process, and moreover, the concentration or sludge resulting from the physical treatment can further be processed by an incineration procedure or solidification procedure as its volume is greatly reduced comparing with the original wastewater.

Recently, with the rapid advance of technology, there are more and more different industrial wastewaters being generated from the manufacturing processes of different industries, which might be composed of many complex compounds that are not biodegradable and thus can not be treated by a simple one-stage process. Moreover, when the wastewater is composed of various high boiling-point organic compounds with high water content, it is difficult to be treated by the simple one-stage process. In the current high-tech industries such as the semiconductor fabrication industry, there are various industrial wastewaters being generated in its manufacturing process, such as those wastewaters generated from the wafer cleaning process, the photoresist removal process, the wet etching process, the abrasion process, the cutting process, or the absorbent regeneration process, and so on. Taking the condensation/absorbent regeneration wastewater generated from the volatile organic compound (VOC) exhaust gas treatment facility in the photoresist removal process, such regeneration wastewater, being mainly composed of certain high boiling-point organic solvents, such as dimethyl sulfoxide (DMSO), monoethanol amine (MEA), N-methyl pyrrolidone (NMP), etc; and a little low boiling-point organic solvent, such as acetone, has a total carbon concentration (TOC) ranged between 8000 mg/L to 16000 mg/L. It is noted that such regeneration wastewater is usually being processed by a means of incineration, but since it's water content is usually higher than 90%, the burning of such regeneration wastewater not only is not energy efficient, but also may cause a great amount of carbon dioxide to be emitted into atmosphere and thus cause another environmental issue.

Taking another kind of wastewater generated from the cleaning of a plastic pipe after it is being processed by a thermal treatment as it is being fabricated, such wastewater will contains ethylene glycol with an average concentration of 0.06M as ethylene glycol whose boiling point is 197.6° C. is used as the heat medium in the thermal treatment. It is noted that the aforesaid wastewater is also high in water content and thus it is not cost efficient to process the same by means of incineration. Nevertheless, considering the long hours of time required for the cultivation and growing of microorganisms used for processing the aforesaid wastewater in a biological manner, it is not feasible to perform a biological treatment upon the aforesaid wastewater, not to mention that the biochemical oxygen demand (BOD) of aforesaid wastewater after being processed by biological treatment usually will excess the standard specified in the environmental regulations.

There are already many prior arts trying to process various organic wastewaters in a multi-stage manner. First, the wastewater is distilled while accumulating and storing the distilled liquid in a storage tank. Next, as the distilled liquid still contain many organic compounds whose concentration is not conform with the environmental standard for discharging, the distilled liquid will be further processed by another treatment, such as a secondary distillation or a $UV/O_3$ treatment, for enabling the TOC of the distilled liquid to drop and thus conform with the environmental standard for discharging. Although the aforesaid multi-stage process is able to reduce the TOC of the wastewater for enabling the same to conform with the environmental standard for discharging, it is sill not feasible since not only it is not energy efficient as it will require to distill the wastewater multiple times, but also it is not economically sound as the $UV/O_3$ treatment or biological treatment is a long-hour treatment that can only be performed with some expensive equipments.

Therefore, it is required to have a low-cost, high-efficient wastewater treatment apparatus and method with much less complicated processes that can be easily adapted for various industries.

SUMMARY OF THE INVENTION

In view of the disadvantages of prior art, the primary object of the present invention is to provide a wastewater treatment apparatus and method with stair-like heat treatment tanks, in which there are zigzagging channels formed inside and passing through the interiors of the stair-like heat treatment tanks by the use of a plurality of baffles to be used for enabling the wastewater to flow therein serpentinely following the zigzagging of the channels so as to prolong the time required of the wastewater to flow in the heat treatment tank while enabling the wastewater to be fully mixed.

It is another object of the invention to provide a wastewater treatment apparatus and method capable of processing a wastewater for recycling the same completely in a manner that the wastewater is being broken down into a cleaned water and a concentrated liquid while enabling the cleaned water to be purified by the use of a water purifier into a purified water conforming with any environmental regulation for discharging or to be stored in a storage tank, and electrolyzing the concentrated liquid so as to recycle the reaction agents to be used in the next wastewater treatment.

It is further another object of the invention to provide a wastewater treatment apparatus and method with much less expense relating to the reaction agent as most of the reaction agents used in the wastewater treatment are recycled.

Yet, another object of the invention is to provide a compact-sized wastewater treatment apparatus with large-volume wastewater processing ability, in that the total volume of the heat treatment tanks occupied is much smaller comparing with the prior arts and the same time that the capacity of wastewater treatment apparatus can be changed according to the increasing/decreasing of the amount of channels being configured inside the stair-like heat treatment tanks.

Yet, another object of the invention is to provide a wastewater treatment apparatus capable of shorten the time required for the organic compounds containing in the wastewater to be broken down, in that the wastewater mixed with reaction agents is heated to 90° C. and allowed to set for 40 minutes for breaking down the organic compounds containing in the wastewater.

Yet, another object of the invention is to provide a wastewater treatment apparatus with much shorter heating time than conventional wastewater treatment apparatus, by that not only the time required for heating the mixed solution is shortened since the room-temperature mixed solution from its mixing tank is first being heated to about 60° C. in a heat exchanger by the heat exchanging between the same and a 90° C. discharging liquid outputted from its stair-like heat treatment tanks, and then the 60° C. mixed solution is being fed into the stair-like heat treatment tank where it is heated to 90° C.; but also the time required for dropping the temperature of the discharging liquid for enabling the same conforming with environmental regulation of discharging is shortened since through the aforesaid heat exchanging between the room-temperature mixed solution, the 90° C. discharging liquid outputted from the stair-like heat treatment tank had already been dropped to about 60° C.

Yet, another object of the invention is to provide a wastewater treatment apparatus whose amount of stair-like heat treatment tanks configured thereat can be adjusted according to the requirement of wastewater treatment capacity.

Yet, another object of the invention is to provide a wastewater treatment apparatus capable of purifying and thus separating its discharging water by the use of a water purifier into a cleaned water and a concentrated liquid for outputting To achieve the above objects, the present invention provides a wastewater treatment apparatus with stair-like heat treatment tanks for performing a breakdown process, comprising: a mixing tank, for evenly mixing a wastewater containing organic compounds with reaction agents and thus forming a mixed solution; a plurality of heat treatment tanks, interconnected with each other into a stair-like structure to be used for enabling the mixed solution to circulate therein while being heating for a period of time so as to perform an organic destruction process upon the mixed solution and thus cause a discharging liquid to be formed; a heat exchanger, for enabling a heat exchanging process between the discharging liquid and the mixed solution to be performed therein; a condensation tank, for receiving and cooling the discharging liquid; a water purifier, for purifying and thus separating the discharging water into a cleaned water and a concentrated liquid for outputting; and an agent recycling unit, for electrolyzing the concentrated liquid so as to recycle the reaction agents.

To achieve the above objects, the present invention provides a wastewater treatment method with stair-like heat treatment tanks for performing a breakdown process, comprising the step of: respectively using a first pump and a second pump to transport a wastewater containing organic compounds and a reaction agent in a reaction tank by a specific proportion to a mixing tank where they are mixed into a mixed solution; using a third pump to transport the mixed solution from the mixing tank to a heat exchanger for performing a heat exchanging process upon the mixed solution so as to heat the mixed solution for outputting; transporting the heated mixed solution from the heat exchanger to a stair-like heat treatment tank where the mixed solution is circulating therein while being heating for a period of time so as to perform an organic destruction process upon the mixed solution and thus cause a discharging liquid to be formed; feeding the discharging liquid back to the heat exchanger for causing the temperature of the discharging liquid to drop before it is being transported to a condensation tank for further cooling down the discharging liquid; using the fourth pump to transport the discharging liquid to a water purifier after the temperature of the discharging liquid is cooled to a specific temperature where the discharging liquid is purified and separated into a cleaned water and a concentrated liquid for outputting; and using a fifth pump to transport the concentrated liquid to a agent recycling unit where it is electrolyzed so as to recycle and transport the resulting reaction agent to the reaction agent tank by the use of a sixth pump, while the cleaned water is being discharged or recycled.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein.

DESCRIPTION OF THE EXEMPLARY EMBODIMENTS

For your esteemed members of reviewing committee to further understand and recognize the fulfilled functions and structural characteristics of the invention, several exemplary embodiments cooperating with detailed description are presented as the follows.

Figure 1:
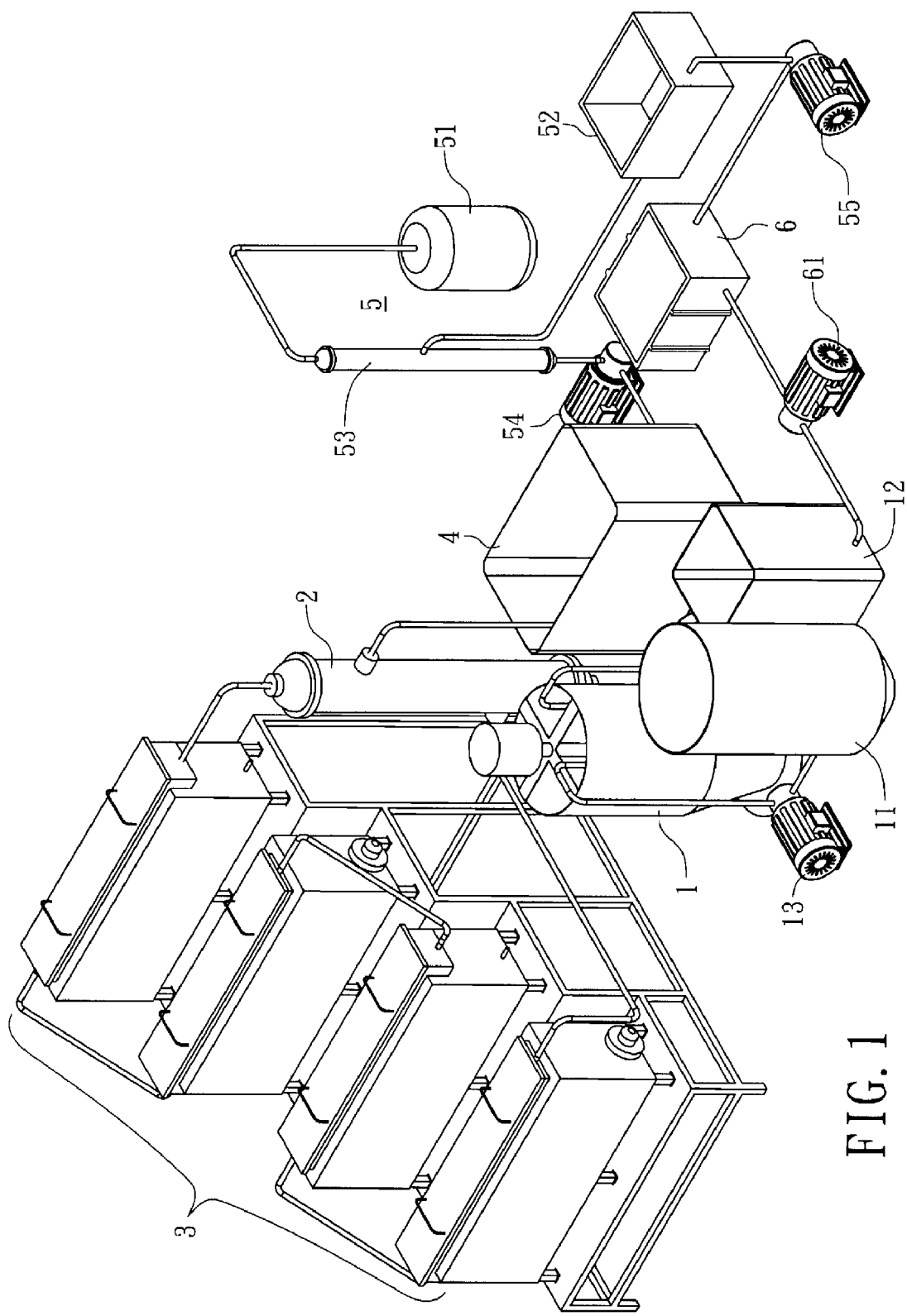
FIG. 1 is a three dimensional view of a wastewater treatment apparatus with stair-like heat treatment tanks according to an embodiment of the invention.
Figure 2:
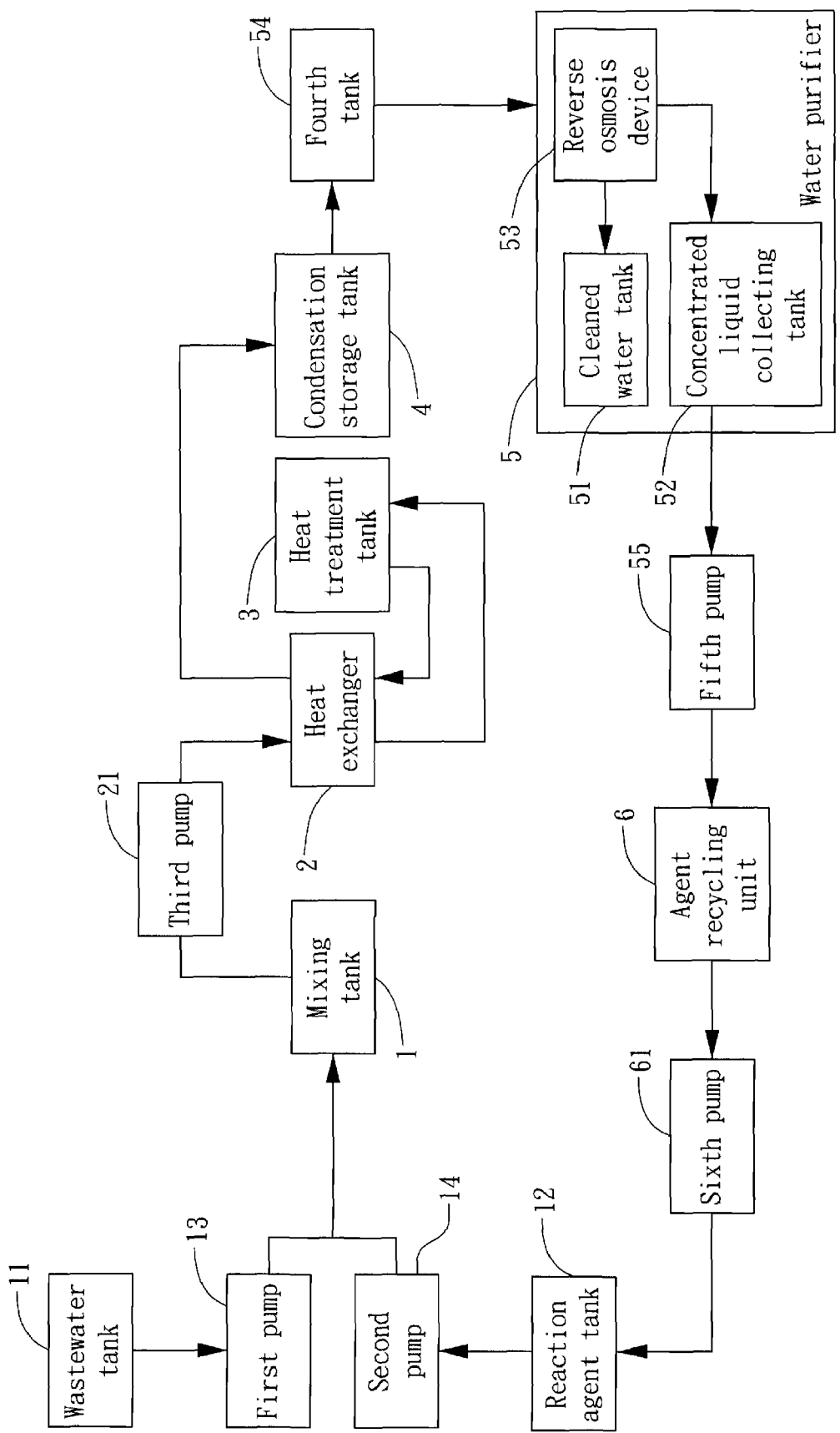
FIG. 2 is a block diagram of a wastewater treatment apparatus with stair-like heat treatment tanks according to an embodiment of the invention.
Figure 3:
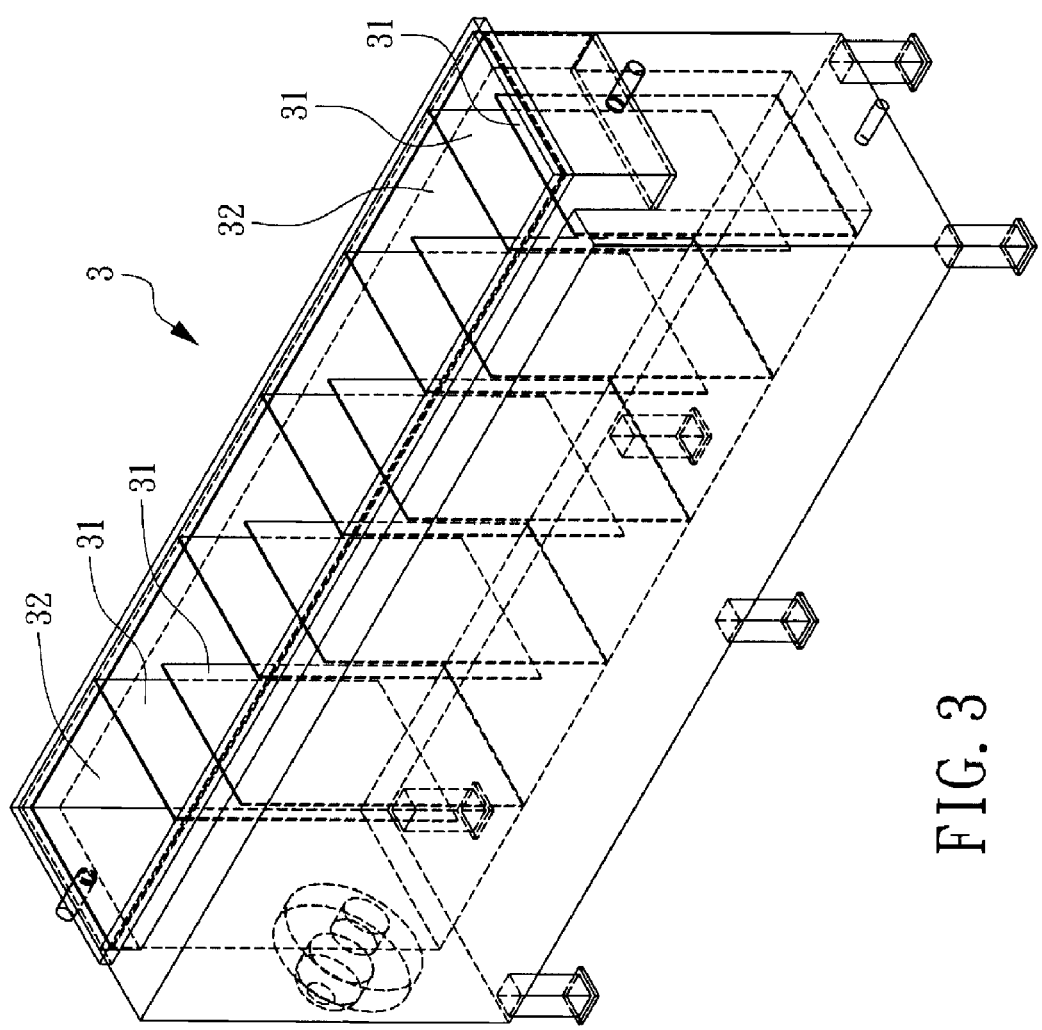
FIG. 3 is a three dimensional perspective view of a heat treatment tank used in the wastewater treatment apparatus of the invention.
Figure 4:
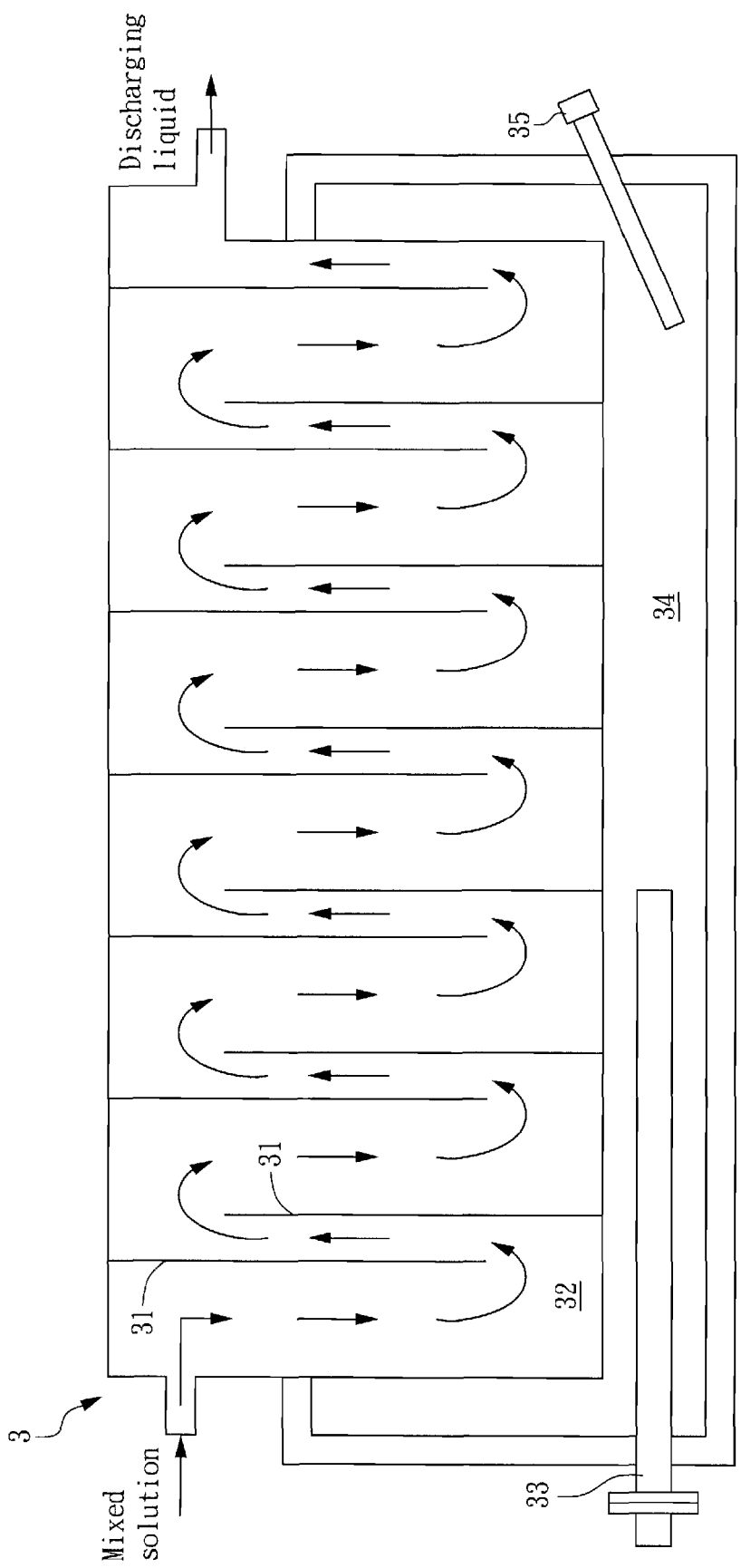
FIG. 4 shows the circulation in the heat treatment tank of the invention.
Figure 5:
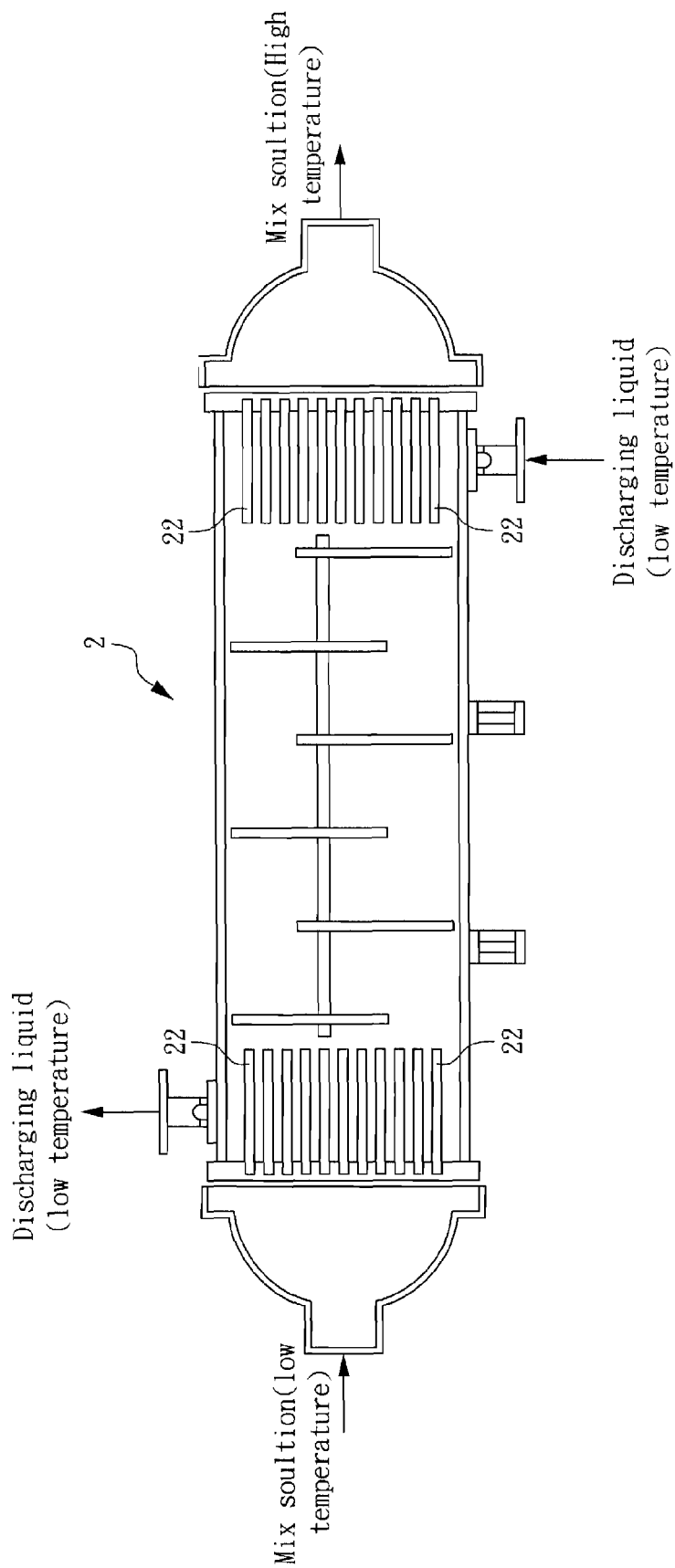
FIG. 5 is a cross sectional view of a heat exchanger used in the wastewater treatment apparatus of the invention.
Figure 6:
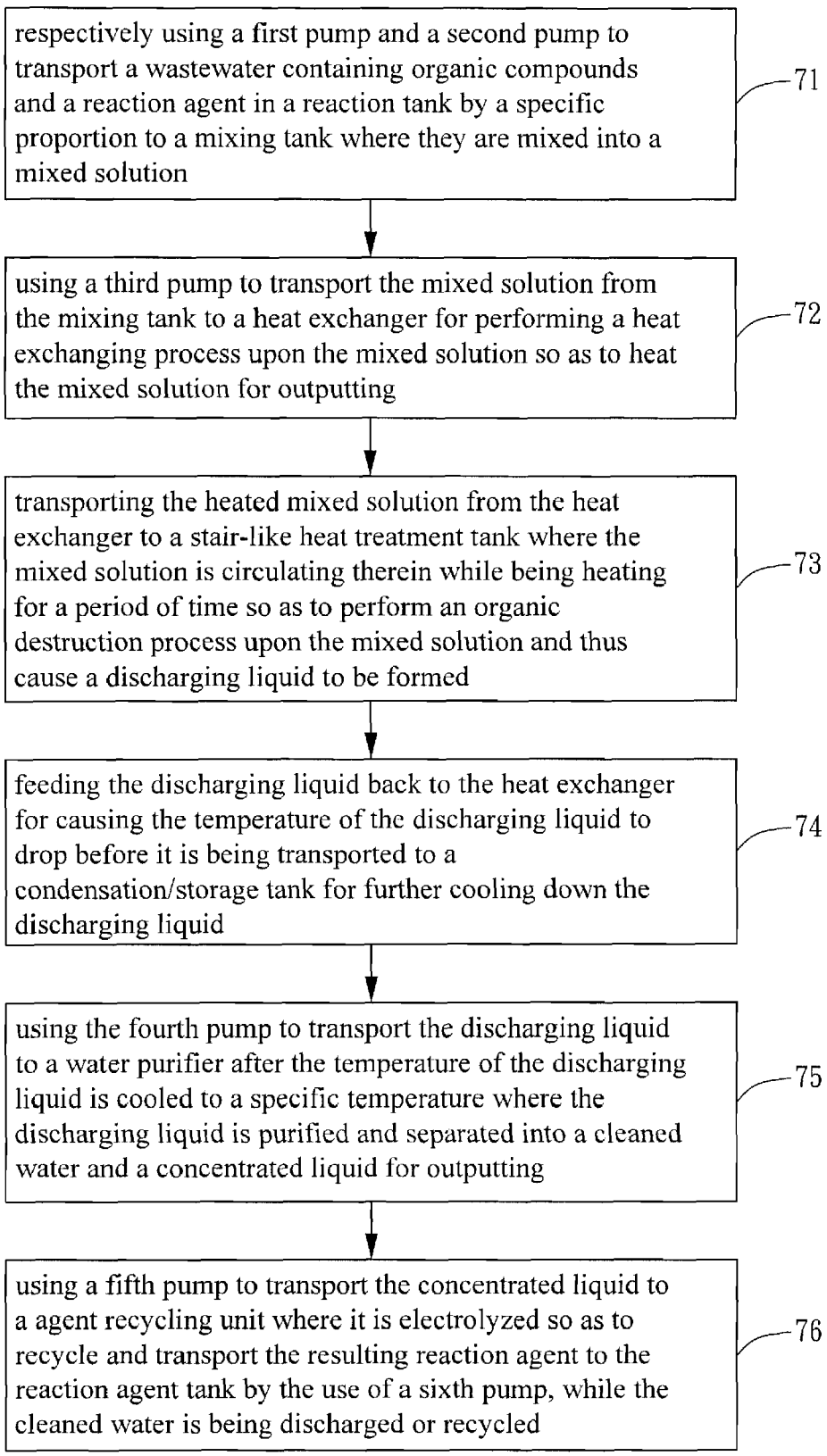
FIG. 6 is a flow chart showing the steps of a wastewater treatment method according to an embodiment of the invention.

Please refer to FIG. 1 and FIG. 2, which show a wastewater treatment apparatus with stair-like heat treatment tanks according to an embodiment of the invention. As shown in FIG. 1 and FIG. 2, the wastewater treatment apparatus has a mixing tank 1, which is used for evenly mixing a wastewater containing organic compounds with a reaction agent and thus forming a mixed solution. It is noted that the reaction agent, being an oxidation agent, can be a persulfide, such as sodium persulfate ($Na_2S_2O_8$) or ammonium persulfate ($(NH_4)_2S_2O_8$). Moreover, the wastewater and the reaction agent are being received respectively in a wastewater tank 11 and a reaction agent tank 12 whereas there is a first pump 13 being disposed at a position between the wastewater tank 11 and the mixing tank 1 while disposing a second pump 14 at a position between the mixing tank 1 and the reaction agent tank 12. As shown in FIG. 3 and FIG. 4, the wastewater treatment apparatus further has a plurality of heat treatment tanks 3, being arranged interconnecting with each other into a stair-like structure for enabling the mixed solution to flow naturally from its higher stairs toward its low stairs without being powered by any external power source; and furthermore, there is at least one zigzagging channel 32 formed inside and passing through the interiors of stair-like structure of the plural heat treatment tanks 3 by the use of a plurality of baffles 31, by that the mixed solution can be enabled to circulate therein while being heating for a period of time so as to perform an organic destruction process upon the mixed solution and thus cause a discharging liquid to be formed. In addition, the mixed solution in the stair-like structure of the plural heat treatment tanks 3 is designed to be heated to a temperature ranged between 70° C. to 100° C., and the time required of the mixed solution to flow in and out the stair-like structure of the plural heat treatment tanks 3 is ranged between 30 minutes to 60 minutes. As shown in FIG. 4, the stair-like structure of the plural heat treatment tanks 3 is configured with a heating unit 33, a heat medium 34 and a thermometer 35, in which the heating device can be an electric heater 33. Please refer to FIG. 5, which is a cross sectional view of a heat exchanger used in the wastewater treatment apparatus of the invention. In FIG. 5, there is a heat exchanger 2 being configured in the wastewater treatment apparatus, which is used for enabling a heat exchanging process between the discharging liquid from the heat treatment tanks 3 and the mixed solution from the mixing tank 1 to be performed therein. It is noted that there is a third pump 21 being arranged at a position between the mixing tank 1 and the heat exchanger 2, and there are a plurality of penetrating tubes 22 being disposed inside the heat exchanger 2. As shown in FIG. 4, the wastewater treatment apparatus further comprises: a condensation tank 4, for receiving and cooling the discharging liquid from the heat exchanger 2; a water purifier 5, including a reverse osmosis membrane device 53, a clean water tank 51 and a concentrated liquid collecting tank 52, for purifying and thus separating the discharging water into a cleaned water and a concentrated liquid for outputting; and an agent recycling unit 6, for receiving and electrolyzing the concentrated liquid so as to recycle the reaction agent by transporting the same to a reaction agent tank 12. It is noted that there is a fourth pump 54 arranged at a position between the condensation tank 4 and the water purifier 5 while there is a fifth pump 55 arranged at a position between the concentrated liquid collecting tank 52 and the agent recycling unit 6. Moreover, there is a sixth pump 61 arranged at a position between the agent recycling unit 6 and the reaction agent tank 12.

With the aforesaid wastewater treatment apparatus, the present invention is capable of providing a wastewater treatment method, which comprises the steps of:

71~respectively using a first pump and a second pump to transport a wastewater containing organic compounds and a reaction agent in a reaction tank by a specific proportion to a mixing tank where they are mixed into a mixed solution;

72~using a third pump to transport the mixed solution from the mixing tank to a heat exchanger for performing a heat exchanging process upon the mixed solution so as to heat the mixed solution for outputting;

73~transporting the heated mixed solution from the heat exchanger to a stair-like heat treatment tank where the mixed solution is circulating therein while being heating for a period of time so as to perform an organic destruction process upon the mixed solution and thus cause a discharging liquid to be formed;

74~feeding the discharging liquid back to the heat exchanger for causing the temperature of the discharging liquid to drop before it is being transported to a condensation/storage tank for further cooling down the discharging liquid;

75~using the fourth pump to transport the discharging liquid to a water purifier after the temperature of the discharging liquid is cooled to a specific temperature where the discharging liquid is purified and separated into a cleaned water and a concentrated liquid for outputting; and 76~using a fifth pump to transport the concentrated liquid to a agent recycling unit where it is electrolyzed so as to recycle and transport the resulting reaction agent to the reaction agent tank by the use of a sixth pump, while the cleaned water is being discharged or recycled.

Accordingly, the present invention has the following advantages:

(1) Zero wastewater discharging: the wastewater treatment apparatus and method of the invention are capable of processing a wastewater while recycling the same completely in a manner that the wastewater is being broken down into a cleaned water and a concentrated liquid while enabling the cleaned water to be purified by the use of a water purifier into a purified water conforming with any environmental regulation for discharging or to be stored in a storage tank, and electrolyzing the concentrated liquid so as to recycle the reaction agents to be used in the next wastewater treatment.

(2) Reduction treatment cost: the performance cost of the wastewater treatment apparatus and method of the invention can be greatly reduce since most of the reaction agents used in the wastewater treatment are recycled.

(3) It is able to provide a compact-sized wastewater treatment apparatus with large-volume wastewater processing ability, in that the total volume of the heat treatment tanks occupied is much smaller comparing with the prior arts and the same time that the capacity of wastewater treatment apparatus can be changed according to the increasing/decreasing of the amount of channels being configured inside the stair-like heat treatment tanks.

(4) It is able to provide a wastewater treatment apparatus capable of shorten the time required for the organic compounds containing in the wastewater to be broken down, in that the wastewater mixed with reaction agents is heated to 90° C. and allowed to set for 40 minutes for breaking down the organic compounds containing in the wastewater.

(5) It is able to provided a wastewater treatment apparatus with much shorter heating time than conventional wastewater treatment apparatus, by that the time required for heating the mixed solution is shortened since the room-temperature mixed solution from its mixing tank is first being heated to about 60° C. in a heat exchanger by the heat exchanging between the same and a 90° C. discharging liquid outputted from its stair-like heat treatment tanks, and then the 60° C. mixed solution is being fed into the stair-like heat treatment tank where it is heated to 90° C. Thereby, the overall energy consumption of the wastewater treatment can be greatly reduced.

(6) Similarly, the time required for dropping the temperature of the discharging liquid for enabling the same conforming with environmental regulation of discharging is shortened since through the aforesaid heat exchanging between the room-temperature mixed solution, the 90° C. discharging liquid outputted from the stair-like heat treatment tank had already been dropped to about 60° C.

(7) It is able to provide a wastewater treatment apparatus whose amount of stair-like heat treatment tanks configured thereat can be adjusted according to the requirement of wastewater treatment capacity.

(8) It is able to provide a wastewater treatment apparatus and method capable of utilizing the zigzagging channels formed inside and passing through the interiors of the stair-like heat treatment tanks for enabling the wastewater to flow therein serpentinely following the zigzagging of the channels so as to prolong the time required of the wastewater to flow in the heat treatment tank while enabling the wastewater to be fully mixed.

(9) It is able to provide a wastewater treatment apparatus capable of purifying and thus separating its discharging water by the use of a water purifier into a cleaned water and a concentrated liquid for outputting.

(10) It is able to provide a wastewater treatment apparatus capable of using its reaction agent recycling unit to electrolyze the concentrated liquid so as to recycle the reaction agent.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

What is claimed is:

1. A wastewater treatment apparatus with stair-like heat treatment tanks for performing a breakdown process, comprising:
    a mixing tank, for evenly mixing a wastewater containing organic compounds with a reaction agent and thus forming a mixed solution;
    a plurality of heat treatment tanks, interconnected with each other into a stair-like structure to be used for enabling the mixed solution to circulate therein while being heated for a period of time so as to perform an organic destruction process upon the mixed solution and thus cause a discharging liquid to be formed;
    a heat exchanger, for enabling a heat exchanging process between the discharging liquid and the mixed solution to be performed therein;
    a condensation tank, for receiving and cooling the discharging liquid;
    a water purifier, for purifying and thus separating the discharging water into a cleaned water and a concentrated liquid for outputting; and
    an agent recycling unit, for receiving and electrolyzing the concentrated liquid so as to recycle the reaction agent.

2. The wastewater treatment apparatus of claim 1, wherein the wastewater and the reaction agent are being received respectively in a wastewater tank and a reaction agent tank.

3. The wastewater treatment apparatus of claim 1, wherein there are two pumps being arranged in a manner that one of the two pump is disposed at a position between the wastewater tank and the mixing tank while disposing the other pump at a position between the mixing tank and the reaction agent tank.

4. The wastewater treatment apparatus of claim 1, wherein there is a pump being arranged at a position between the mixing tank and the heat exchanger.

5. The wastewater treatment apparatus of claim 1, wherein there is a pump being arranged at a position between the condensation tank and the water purifier.

6. The wastewater treatment apparatus of claim 1, wherein there is a pump being arranged at a position between the agent recycling unit and the reaction agent tank.

7. The wastewater treatment apparatus of claim 1, wherein the stair-like structure of the plural heat treatment tanks is configured with a heating unit, a heat medium and a thermometer.

8. The wastewater treatment apparatus of claim 7, wherein the heating unit is an electric heater.

9. The wastewater treatment apparatus of claim 1, wherein there is at least one zigzagging channel formed inside and passing through the interiors of stair-like structure of the plural heat treatment tanks by the use of a plurality of baffles.

10. The wastewater treatment apparatus of claim 1, wherein the reaction agent is an oxidation agent.

11. The wastewater treatment apparatus of claim 10, wherein the oxidation agent is a material selected from the group consisting of: sodium persulfate and ammonium persulfate.

12. The wastewater treatment apparatus of claim 1, wherein recycling of the reaction agent by the agent recycling unit is enabled by the ability to perform an electrolyze process.

13. The wastewater treatment apparatus of claim 1, wherein the water purifier further comprises: a reverse osmosis membrane unit, a clean water tank, and a concentrated liquid collecting tank.

14. The wastewater treatment apparatus of claim 1, wherein the mixed solution in the stair-like structure of the plural heat treatment tanks is heated to a temperature ranged between 70° C. to 100° C.

15. The wastewater treatment apparatus of claim 1, wherein the time required of the mixed solution to flow in and out the stair-like structure of the plural heat treatment tanks is ranged between 30 minutes to 60 minutes.

16. The wastewater treatment apparatus of claim 1, wherein the stair-like structure is formed in a manner selected from the group consisting of: a single tank with a stair-like shape and an assembly of more than two tanks that are interconnected with each other to form a stair-like structure.

17. The wastewater treatment apparatus of claim 1, wherein the heat exchanger has a plurality of penetrating tubes formed therein.

18. A wastewater treatment method with stair-like heat treatment tanks for performing a breakdown process, comprising the step of:
    respectively using a first pump and a second pump to transport a wastewater containing organic compounds and a reaction agent in a reaction tank by a specific proportion to a mixing tank where they are mixed into a mixed solution;
    using a third pump to transport the mixed solution from the mixing tank to a heat exchanger for performing a heat exchanging process upon the mixed solution so as to heat the mixed solution for outputting;
    transporting the heated mixed solution from the heat exchanger to a stair-like heat treatment tank where the mixed solution is circulating therein while being heated for a period of time so as to perform an organic destruction process upon the mixed solution and thus cause a discharging liquid to be formed;
    feeding the discharging liquid back to the heat exchanger for causing the temperature of the discharging liquid to drop before it is being transported to a condensation tank for further cooling down the discharging liquid;
    using the fourth pump to transport the discharging liquid to a water purifier after the temperature of the discharging liquid is cooled to a specific temperature where the discharging liquid is purified and separated into a cleaned water and a concentrated liquid for outputting; and
    using a fifth pump to transport the concentrated liquid to a agent recycling unit where it is electrolyzed so as to recycle and transport the resulting reaction agent to the reaction agent tank by the use of a sixth pump, while the cleaned water is being discharged or recycled.

19. The wastewater treatment method of claim 18, wherein the stair-like heat treatment tank is configured with a heating unit, a heat medium and a thermometer.

20. The wastewater treatment method of claim 18, wherein the heating unit is an electric heater.

21. The wastewater treatment method of claim 18, wherein there is at least one zigzagging channel formed inside and passing through the interiors of stair-like heat treatment tank by the use of a plurality of baffles.

22. The wastewater treatment method of claim 18, wherein the reaction agent is an oxidation agent.

23. The wastewater treatment method of claim 18, wherein the oxidation agent is a material selected from the group consisting of: sodium persulfate and ammonium persulfate.

24. The wastewater treatment method of claim 18, wherein recycling of the reaction agent by the agent recycling unit is enabled by the ability to perform an electrolyze process.

25. The wastewater treatment method of claim 18, wherein the water purifier further comprises: a reverse osmosis membrane unit, a clean water tank, and a concentrated liquid collecting tank.

26. The wastewater treatment method of claim 18, wherein the heat exchanger has a plurality of penetrating tubes formed therein.

27. The wastewater treatment method of claim 18, wherein the mixed solution in the stair-like heat treatment tank is heated to a temperature ranged between 70° C. to 100° C.

28. The wastewater treatment method of claim 18, wherein the time required of the mixed solution to flow in and out the stair-like heat treatment tank is ranged between 30 minutes to 60 minutes.

* * * * *